(12) United States Patent
Scaliti et al.

(10) Patent No.: US 9,327,857 B2
(45) Date of Patent: May 3, 2016

(54) METHOD OF PACKAGING A PRODUCT AND CORRESPONDING PACKAGE

(71) Applicant: SOREMARTEC S.A., Arlon (BE)

(72) Inventors: Pier Carlo Scaliti, Cuneo (IT); Giuseppe Terrasi, Cuneo (IT)

(73) Assignee: SOREMARTEC, S.A., Findel (LU)

( * ) Notice: Subject to any disclaimer, the term of this patent is extended or adjusted under 35 U.S.C. 154(b) by 491 days.

(21) Appl. No.: 13/874,740

(22) Filed: May 1, 2013

(65) Prior Publication Data

US 2013/0318924 A1    Dec. 5, 2013

Related U.S. Application Data

(62) Division of application No. 12/810,226, filed as application No. PCT/IT2007/000918 on Dec. 28, 2007, now abandoned.

(51) Int. Cl.
*B65B 67/08* (2006.01)
*B65B 11/54* (2006.01)
(Continued)

(52) U.S. Cl.
CPC ............ *B65B 67/08* (2013.01); *B65B 11/50* (2013.01); *B65B 11/54* (2013.01); *B65B 25/005* (2013.01); *B65B 41/06* (2013.01); *B65B 49/06* (2013.01); *B65B 51/14* (2013.01); *B65B 61/24* (2013.01); *B65D 75/322* (2013.01); *B65D 77/02* (2013.01);
(Continued)

(58) Field of Classification Search
CPC .......... B65B 9/04; B65B 9/045; B65B 11/50; B65B 11/52; B65B 25/005; B65B 47/04; B65B 61/24; B65B 2220/16; B65B 49/00–49/06

USPC ................... 53/449, 453, 461, 463, 464, 221
See application file for complete search history.

(56) References Cited

U.S. PATENT DOCUMENTS 3,155,853 A * 11/1964 Spurlin ..................... B06B 1/04
267/165
3,169,309 A    2/1965  Groman
(Continued)

FOREIGN PATENT DOCUMENTS

EP    0591742 A1    4/1994
EP    0790184 A1    8/1997
(Continued)

OTHER PUBLICATIONS

English-language translation of Office Action issued in Japanese Application No. 2010-540227, dated Aug. 28, 2012, 3 pages.

(Continued)

*Primary Examiner* — Hemant M Desai
*Assistant Examiner* — Valentin Neacsu
(74) *Attorney, Agent, or Firm* — Rothwell, Figg, Ernst & Manbeck P.C.

(57) ABSTRACT

A method for wrapping a product in a sheet material wrapper employing a first sheet of plastically deformable sheet material (for example aluminium) and a second sheet of wrapping material (for example a plastic film) having springback. Once the product is placed on the first sheet, the second sheet is applied on the product providing in the second sheet a part wrapping the product and a part facing the first sheet. The first sheet and the part of said second sheet facing it are airtight-seal coupled so to form, by effect of the coupling, a plastically deformable composite sheet material against the product or to form an integral housing cup.

12 Claims, 7 Drawing Sheets

(51) Int. Cl.
    *B65B 11/50*     (2006.01)
    *B65B 25/00*     (2006.01)
    *B65B 41/06*     (2006.01)
    *B65B 49/06*     (2006.01)
    *B65B 51/14*     (2006.01)
    *B65B 61/24*     (2006.01)
    *B65D 75/32*     (2006.01)
    *B65D 77/02*     (2006.01)
    *B29C 65/00*     (2006.01)
    *B65B 51/22*     (2006.01)

(52) U.S. Cl.
    CPC ............. *B29C 66/849* (2013.01); *B65B 51/225* (2013.01); *B65B 2220/16* (2013.01)

(56) References Cited

U.S. PATENT DOCUMENTS

| | | | | |
|---|---|---|---|---|
| 3,865,302 A * | 2/1975 | Kane | ...... | B65D 77/20 156/334 |
| 4,510,735 A * | 4/1985 | Cillario | ...... | B65B 11/54 53/226 |
| 4,801,017 A | 1/1989 | Artusi | | |
| 5,443,546 A * | 8/1995 | Bertalero | ...... | B29C 65/7441 53/221 |
| 5,560,182 A * | 10/1996 | Garwood | ...... | B65B 7/168 426/118 |
| 5,775,060 A * | 7/1998 | Ferrero | ...... | B31B 43/00 29/17.1 |
| 5,802,806 A * | 9/1998 | Scaliti | ...... | B65B 11/54 53/221 |
| 6,248,380 B1 * | 6/2001 | Kocher | ...... | B32B 7/06 206/484 |
| 6,311,844 B1 * | 11/2001 | Ridgeway | ...... | B65D 5/5028 206/583 |
| 6,513,306 B1 * | 2/2003 | Milano | ...... | B65B 11/50 53/221 |
| 6,991,109 B1 * | 1/2006 | Shannon | ...... | B65B 31/047 206/484 |
| 2004/0163990 A1 * | 8/2004 | Begim | ...... | B65D 75/32 206/472 |
| 2004/0231294 A1 * | 11/2004 | Shannon | ...... | B65B 31/046 53/434 |
| 2005/0103678 A1 * | 5/2005 | Clark | ...... | A61J 1/035 206/538 |
| 2006/0147588 A1 | 7/2006 | Garwood | | |
| 2008/0160249 A1 | 7/2008 | Makino | | |
| 2009/0047374 A1 | 2/2009 | Galt et al. | | |

FOREIGN PATENT DOCUMENTS

| | | | | |
|---|---|---|---|---|
| EP | 1046579 A1 | 10/2000 | | |
| EP | 1473245 A1 | 11/2004 | | |
| GB | 984259 A * | 2/1965 | ................ | F16F 3/06 |
| JP | S50-161555 | 11/1975 | | |
| JP | 07-205914 A | 8/1995 | | |
| JP | 2000-318760 A | 11/2000 | | |
| JP | 2006-504446 A | 2/2006 | | |
| WO | 03095332 A1 | 11/2003 | | |
| WO | 2007/007141 A1 | 1/2007 | | |
| WO | 2007007141 A1 | 1/2007 | | |

OTHER PUBLICATIONS

English translation of Office Action issued in Japanese Patent Application No. 2010-540227, 3 pages.

* cited by examiner

METHOD OF PACKAGING A PRODUCT AND CORRESPONDING PACKAGE

CROSS REFERENCE TO RELATED APPLICATIONS

The present application is a divisional of U.S. patent application Ser. No. 12/810,226, filed on Jun. 23, 2010, which is a 35 U.S.C. §371 National Phase Entry Application from PCT/IT2007/000918 filed Dec. 28, 2007, and designating the United States, the disclosures of which are incorporated herein in their entireties by reference.

FIELD OF THE INVENTION

The present invention refers to techniques for product packaging and has been developed with reference to the possible application to the packaging of food products.

Although the reference to such possible field of application should not be interpreted as limiting the scope of the invention.

DESCRIPTION OF THE RELATED ART

The solution described herein can be seen as a development of the solution described in the document EP-A-0 591 742. The solution described in such document (solutions somewhat similar are described in the documents EP-A-0 790 184 and EP-A-1 046 579) is destined to provide a hermetic wrapper (or airtight seal) for the packaging of a product such as a sweet food product.

Such solution employs a first and second sheet of wrapping material. The first sheet is subjected to a shaping operation ("drawing") directed at conferring a shell or basin-like shape substantially complementary to the shape of the product. Once shaped, the first sheet can house a great part of the product inside. The second sheet is then applied as a covering of the product inserted into the first shaped sheet and the two sheets are then connected to each other so to provide a substantially closed wrapper around the product. The two sheets are then subjected to a successive shaping operation destined to provide an airtight sealed wrapper adhering to the surface of the product.

Then the product can be located in a receiving cup (for example, a cup with pleated walls of the type currently called "petit fours"). According to the solution described in EP-A-1 046 579, the shaping operation of the two wrapping sheets leads instead to providing an integrated shaped portion reproducing the shape of the above said receiving cup.

The solutions described in the cited documents were set up in view of the use of a plastically deformable (or permanently deformable) material as the manufacturing material of the first and second sheet.

By plastic or permanent deformability it is currently intended the capacity of a body to be deformed and to stably keep the deformed shape, even when the deforming force is removed. An aluminium foil of the type traditionally used for packaging sweets such as candies or chocolates is a typical example of a plastically deformable material: if one takes a sheet of this material and crumples it into a ball, the material will keep, in a substantially stable way, the ball-like shape.

Opposite to such behaviour is an elastic deformability, in which the deformed body returns, more or less rapidly, to the shape that it had before being deformed, once the deforming force is removed. As with plastic deformability, in absolute terms, also the elastic type of deformability is an ideal model: most materials deformable in an elastic way, in reality have a more or less pronounced springback. Thus, by springback it is intended the tendency of a folded or shaped elastic material to return to its original shape once the deforming force is removed.

Polypropylene or polythene based sheet wrapping materials represent typical examples of materials showing a springback: if one crumples a sheet of this material into a ball, the material tends, more or less rapidly, to lose the ball-like shape and to "reopen" more or less extensively.

Solutions such as the one described in EP-A-0 591 742 are ideal for the employment of sheet materials essentially made of aluminium foil, eventually coupled with one or more layers of coating material. Thus we speak of plastically or permanently deformable materials.

In various branches of the packaging industry, and specifically in the branch of food product packaging, a trend to shifting from sheet wrapping materials in aluminium or the like (such as the type traditionally used for packaging sweets) to laminated materials of different nature based on polypropylene, polythene, etc. is increasingly evident.

With respect to traditional materials such as aluminium, these new materials have advantages such as, for example, a higher capacity of performing a barrier function (therefore, of protection) against i) the penetration of external agents into the package and/or ii) the outward migration of agents contained in the package. This is particularly true regarding the possibility of realising an efficacious barrier action against so-called organoleptic contamination, that is, the phenomenon of products with different flavours located in adjacent parts of the same package undesirably transferring flavours and aromas to each other.

Also, these new materials are particularly suitable to being printed, that is, to being subjected to decorative treatments, such as metalisation treatments, so to make the packages particularly pleasant from an aesthetic point of view.

An additional factor (last in the list, but certainly not in importance), these materials have better possibilities for disposal, with a more reduced environmental impact with respect to the traditional packaging materials.

OBJECT AND SUMMARY OF THE INVENTION

With respect to traditional materials such as aluminium, however, the alternative wrapping materials previously described demonstrate more or less evident springback characteristics. Therefore, for such materials, it is quite difficult to prefigure the application of techniques such as those described in the documents cited in the preamble of the present description without the use of accessory elements (for example, shaping elements operating by heat deformation, etc.).

Therefore, the object of the present invention is that of providing a solution that, while keeping the efficiency and simplicity of the previously described solutions, is easily applicable to the realisation of packages including the use of a sheet material which, unlike a material such as aluminium foil, does not have plastic-like deformability characteristics but, on the contrary, shows at least a certain degree of springback.

According to the present invention, such object is achieved thanks to a method having the characteristics recalled in the following claims. The invention also concerns a corresponding package. The claims are an integral part of the disclosure provided herein relative to the invention.

BRIEF DESCRIPTION OF THE ATTACHED DRAWINGS

The invention will now be described, as a non-limiting example, with reference to the attached drawings, in which:

FIGS. 1 to 5 represent successive steps in the implementation of a method as described herein, and FIGS. 6 and 7, on one hand, and FIGS. 8 and 9 on the other hand, represent two possible variants adoptable for completion of the steps of the method illustrated in FIGS. 1 to 5.

DETAILED DESCRIPTION OF EXAMPLES OF EMBODIMENT

The exemplary embodiment illustrated herein (which, recall, is an example and must be considered as such, therefore, non-limiting to the scope of the invention) refers to the packaging of a food product P.

Also as an example, and therefore with no intention of limiting the scope of the invention, the product P can be represented by a praline of variable nature and composition, coated or non-coated, having for example, a spherical shape or, as is schematically represented in the attached drawings, a shape that can be seen as essentially corresponding to a spherical shape with a "flattened" bottom so to provide a flat seating surface for the product P. In any case, the specific characteristics of the product P are not themselves determinant for the purpose of comprehending and implementation of the solution described herein.

The method described herein aims to realise around the product P a package made of a wrapper of sheet material having airtight (hermetic) sealing characteristics. One therefore speaks of a sheet material wrapper susceptible of wrapping the product P, avoiding the penetration of external agents inside the package itself and/or the escape of internal agents from the package itself, with possible risk of contamination of the product P. There can be various reasons for needing to realise an airtight sealed package of this type. Among these, the need to extend product shelf life can be cited. In this regard, one can also refer to the documents cited in the interlocutory portion of the present description.

As in the case of the solution described in these previous documents, the wrapper of sheet material is destined to be made of a first sheet 1 and a second sheet 2.

With reference to their relative dimensions, the two sheets under consideration (henceforth, for simplicity referred to as square shaped sheets, but these sheets can have any shape, in particular, in function of the shape and dimensions of the product P) can be generally seen as a "small" sheet 1 and a "large" sheet 2.

Figure 6:
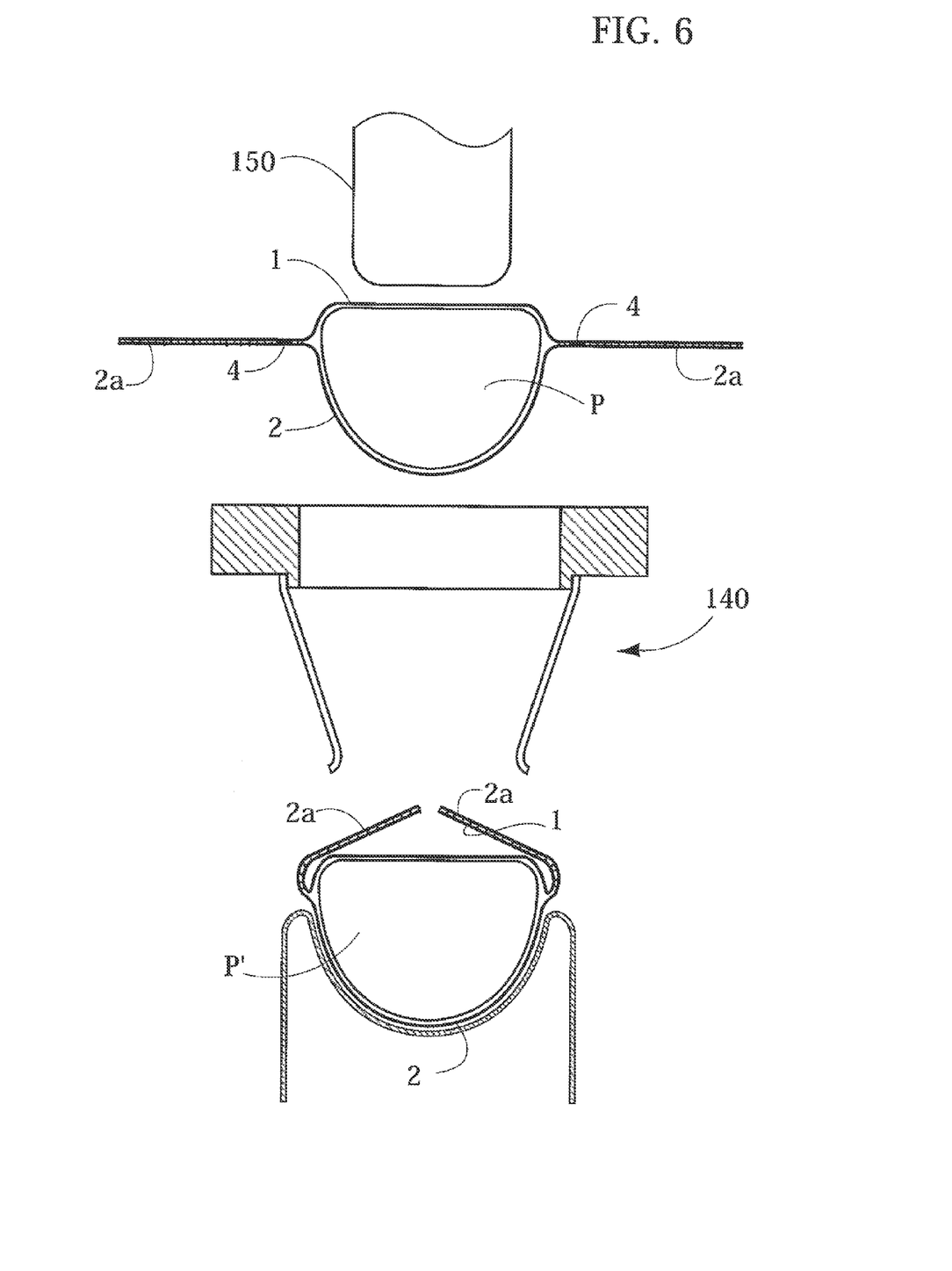
Figure 7:
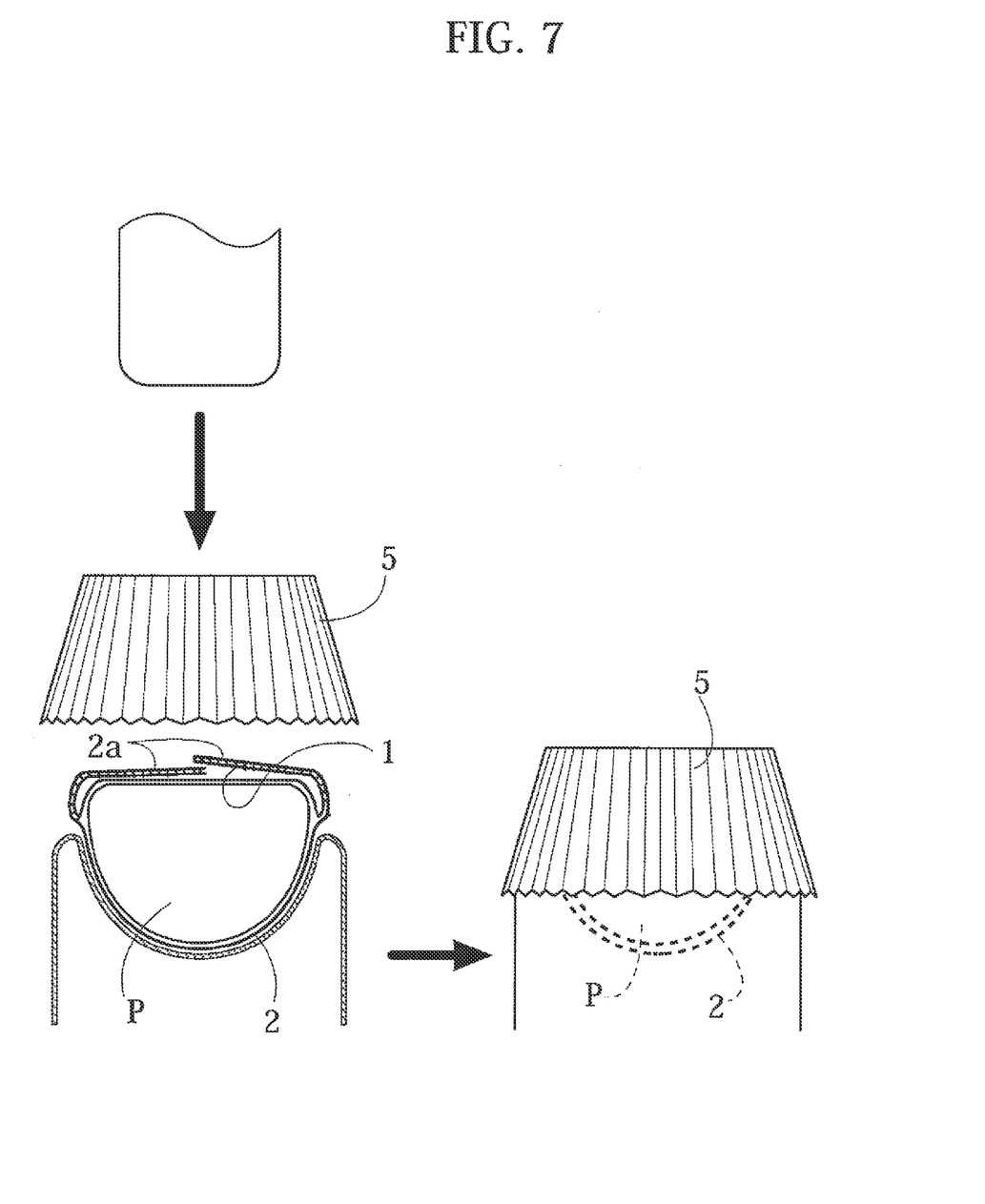
Figure 8:
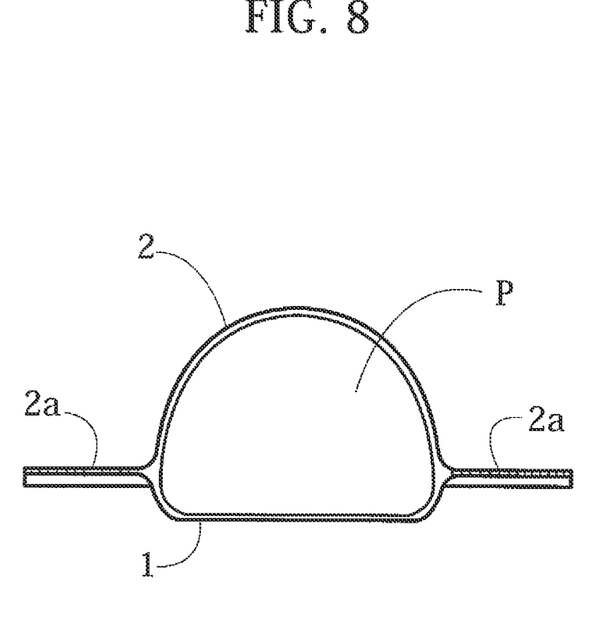
Figure 9:
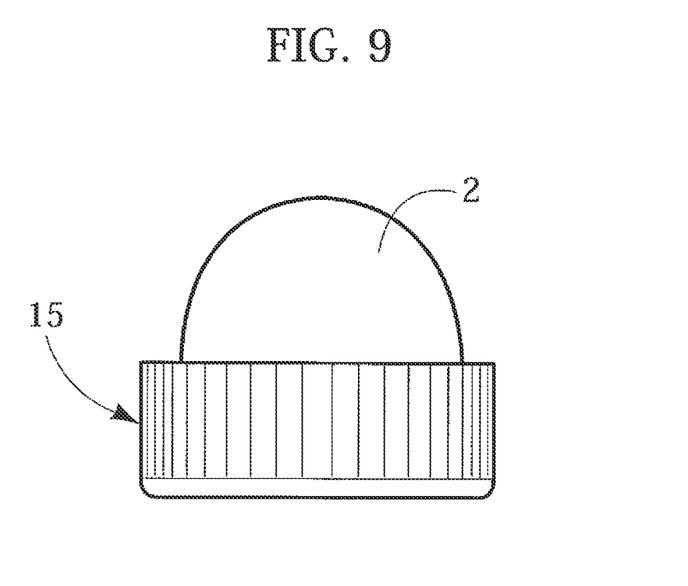

This difference in dimension can be justified above all in the case of the evolution of the method according to the steps illustrated in FIGS. 6 and 7, while it could be less significant in the case of the evolution according to FIGS. 8 and 9. Generally, the choice of making sheet 2 of larger dimension can be justified, even if not completely essential, when sheet 2 is destined to "cover" at least in part, sheet 1.

Instead, sheets 1 and 2 differ in their deformability characteristic.

Sheet 1 is made of a lamina of plastically (or permanently) deformable material.

Sheet 2, instead, is made of a lamina of a material exhibiting springback.

For example, sheet 1 can be a wrapping sheet of the type referred to in the prior art documents cited repeatedly in the introduction of the present description. This could for example be a sheet of aluminium foil (for example with a thickness of 15-50 microns) possibly coated on its upper surface (that is the surface destined to face the product P) with a layer of material such as, for example, polythene, having thermal welding characteristics. In other words, it is a material of the type currently indicated in the field as "coupled" material.

Instead, sheet 2 is made of a lamina also having a thickness on the order of 15-50 microns and including a layer of polypropylene (PP) or similar polymers, destined to face the outside of the package (intended as the part visible from the outside) and possibly presenting a finishing varnish on its outer surface. On its inner surface, the above-said layer of polypropylene can have a thin metalisation made by vapour-phase deposition (in a vacuum chamber) so to realise a so-called metalisation or aluminisation, providing the film with characteristics of brilliance and shininess. Sheet 2 can also include an additional layer of material such as polythene so to provide a sandwich-like structure in which the metalised layer is interposed between the (outer) layer of polypropylene and the (inner) layer of polythene.

Naturally the choice of these materials is not essential. The choice of polythene can be due to the wish to have a layer on the inner side of the sheet 2 that can form an intimate connection by thermal welding to the material of the first sheet 1, that is, on the side destined to face the product P.

Whatever its structure and its composition, sheet 2 is such not to have in its entirety characteristics of plastic deformability: if subjected to deformation, sheet 2 does not permanently keep (unlike a film or sheet with characteristics of plastic deformability) the shape that it was given, but instead it tends to elastically return to the initial un-deformed shape.

Figure 1:
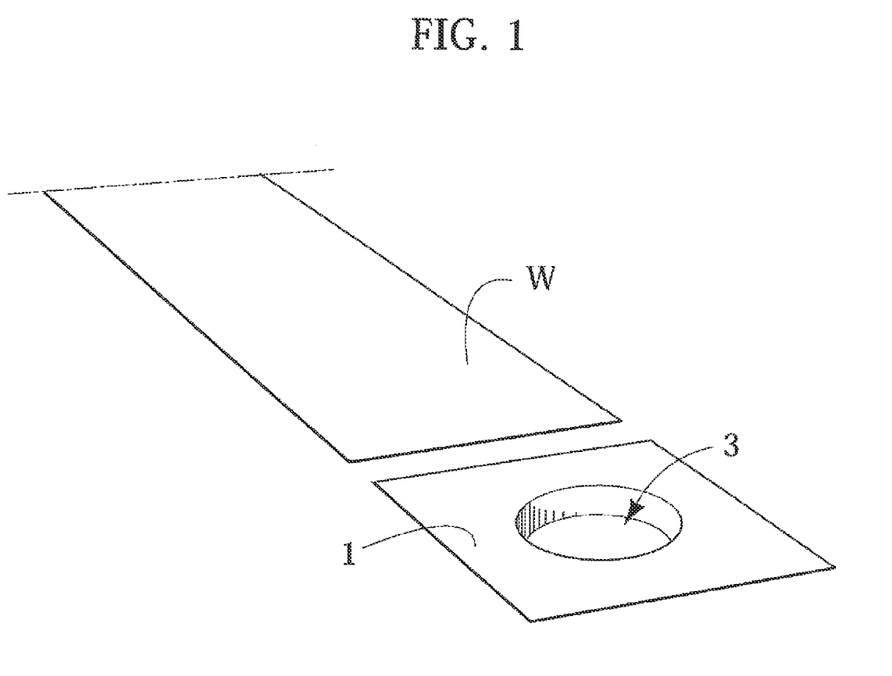
Figure 2:
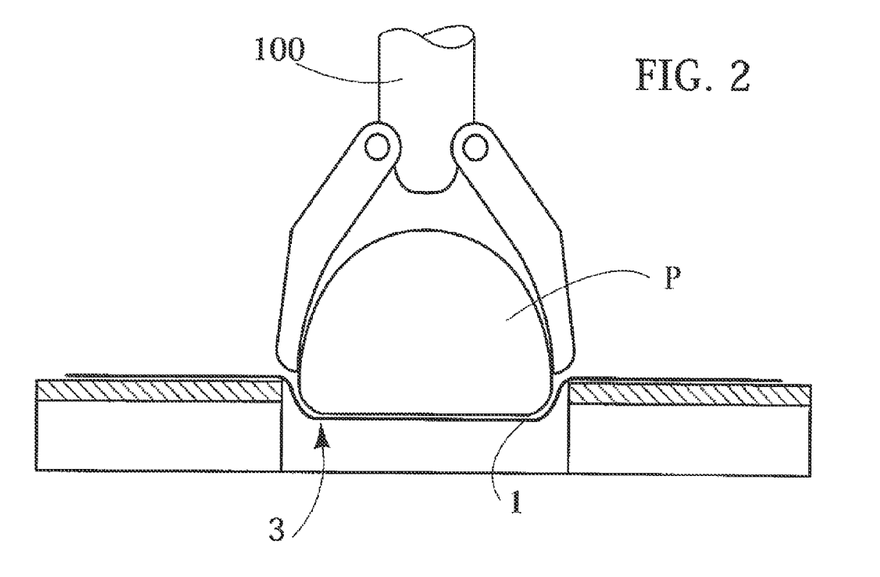

In the first step of the method presented herein, as an example, in FIG. 1 it is shown that sheet 1 is obtained by cutting a roll or web W of starting material. One can assume that sheet 1 is located on a work surface (not specifically illustrated) such as, for example, the surface of a conveyor means included in a machine for the automatic packaging of products. This, for example, for the purpose of possibly being subjected (through a known tool), to the formation of a hollow imprint 3 of reduced depth susceptible of providing a housing and retaining place for the product P, destined to be located on the sheet 1 through a tool 100 (for example grasper-like) as is schematically illustrated in FIG. 2.

The imprint 3 can have, for example, a lens-like concave shape, or a generally shell or basin-like configuration, therefore a shape approximately complementary to a lower marginal part of the product P destined to be housed in the cavity 3. All of this, for example, to avoid that the product P moves in an undesirable way with respect to sheet 1 when (as normally happens during the packaging cycle) sheet 1 with product P is advanced, for example, along a conveyor line.

It will also be appreciated that the option of realising the imprint 3 in sheet 1 is not essential. The presence of such imprint can be advantageous in the case in which the product P has a perfectly spherical shape, therefore showing a certain tendency to roll on sheet 1, usually less marked in the case of a product already having a flattened part on the bottom. In any case, a possible anchoring effect of the product P to sheet 1 can also be obtained through other means, for example, through deposition of food-grade adhesive material.

It will also be appreciated that, if provided, the hollow imprint 3 is made in a plastically deformable material, once imprinted in sheet 1, such imprint remains in a substantially stable way.

Figure 3:
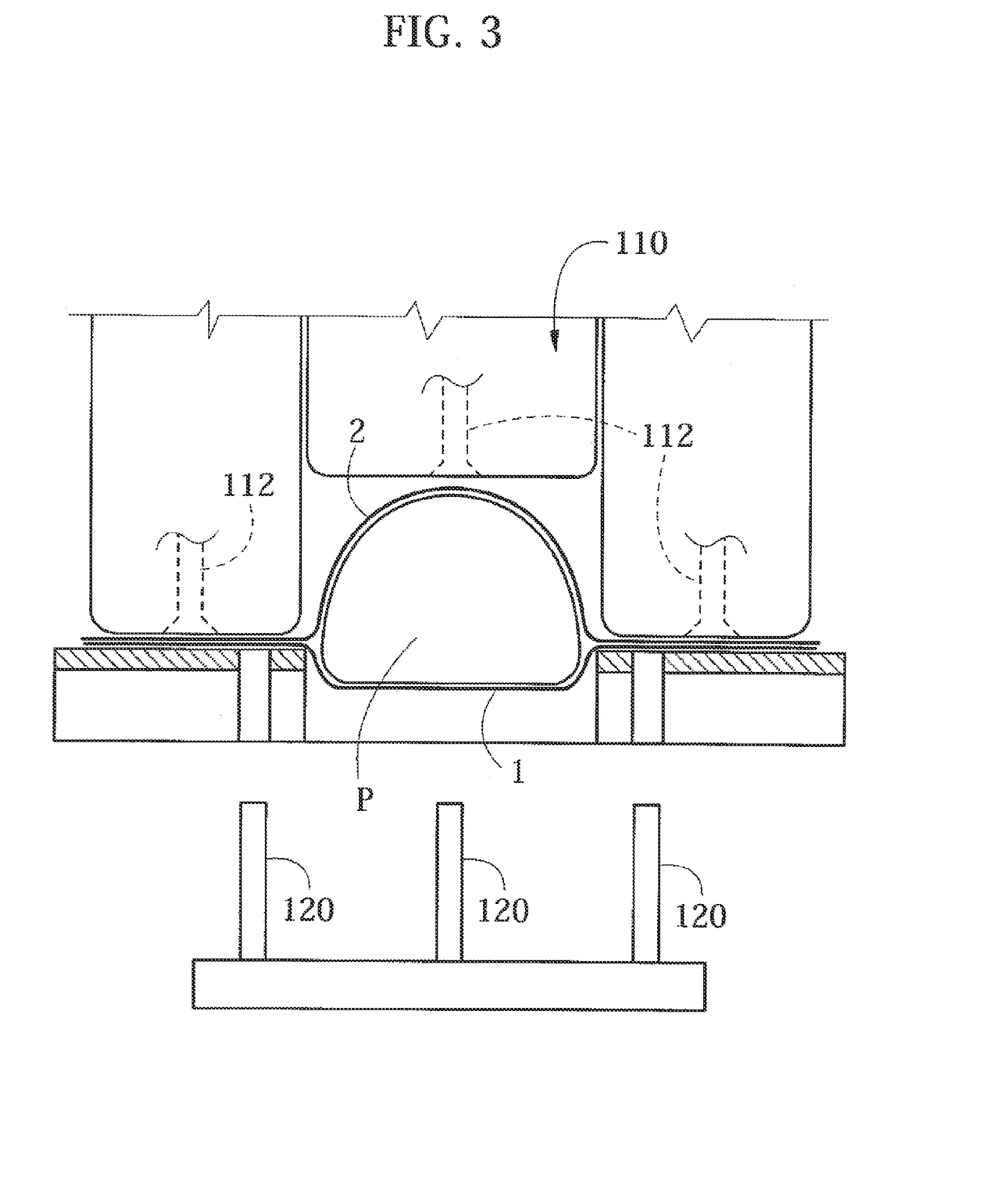

FIG. 3 represents an additional step in which the second sheet 2 is applied on product P with a tool 120 arriving from above and having an overall ring-like configuration, so to be able to "embrace" the upper part of the product P on which sheet 2 is applied. Sheet 2 is retained by tool 120—in a known way—through a holding vacuum action (see the "vacuum"

lines represented by broken lines and indicated with 112) even allowing a limited sliding of sheet 2 with respect to the surface of tool 110.

Sheet 2 is then wrapped around the product P. Once the downward movement of the tool 110 is completed, leading to the fitting of sheet 2 above and around the product P, sheet 2 has an approximately dome shaped central portion wrapping the product P and a flat part 2a which is coextensive with sheet 1 where sheet 1 is facing sheet 2.

Once such condition is reached, one proceeds with the realisation of a tacking operation so to connect, at least at points, sheets 1 and 2 approximately in correspondence with the region surrounding the product P in which the two sheets 1 and 2 are in contact with each other. Such tacking, represented here with dots 4 (see FIG. 4), can be realised, for example, through a crown of finger-like thermal welding elements 120 arising from below against the lower surface of sheet 1 and determining localised fusion, with consequent welding of sheets 1 and 2. Such localised fusion can involve at least one layer of plastic material present on the facing of one or both sheets. For example, in the present example of embodiment, one can think that the localised fusion involves the polythene layer present on the lower surface of sheet 2.

Naturally, the above-said tacking can also be realised with different technologies: for example, through ultrasonic welding.

The presence of the above-said tacking (which can be continuous or discontinuous) enables the shaping tool 110 to rise up, preventing sheet 2 from losing the dome-like conformation with which it had been provided in its central part; which the material of sheet 2 would tend to do, not itself having—as was repeatedly stated—plastic deformability characteristics, but instead exhibiting springback properties.

Figure 4:
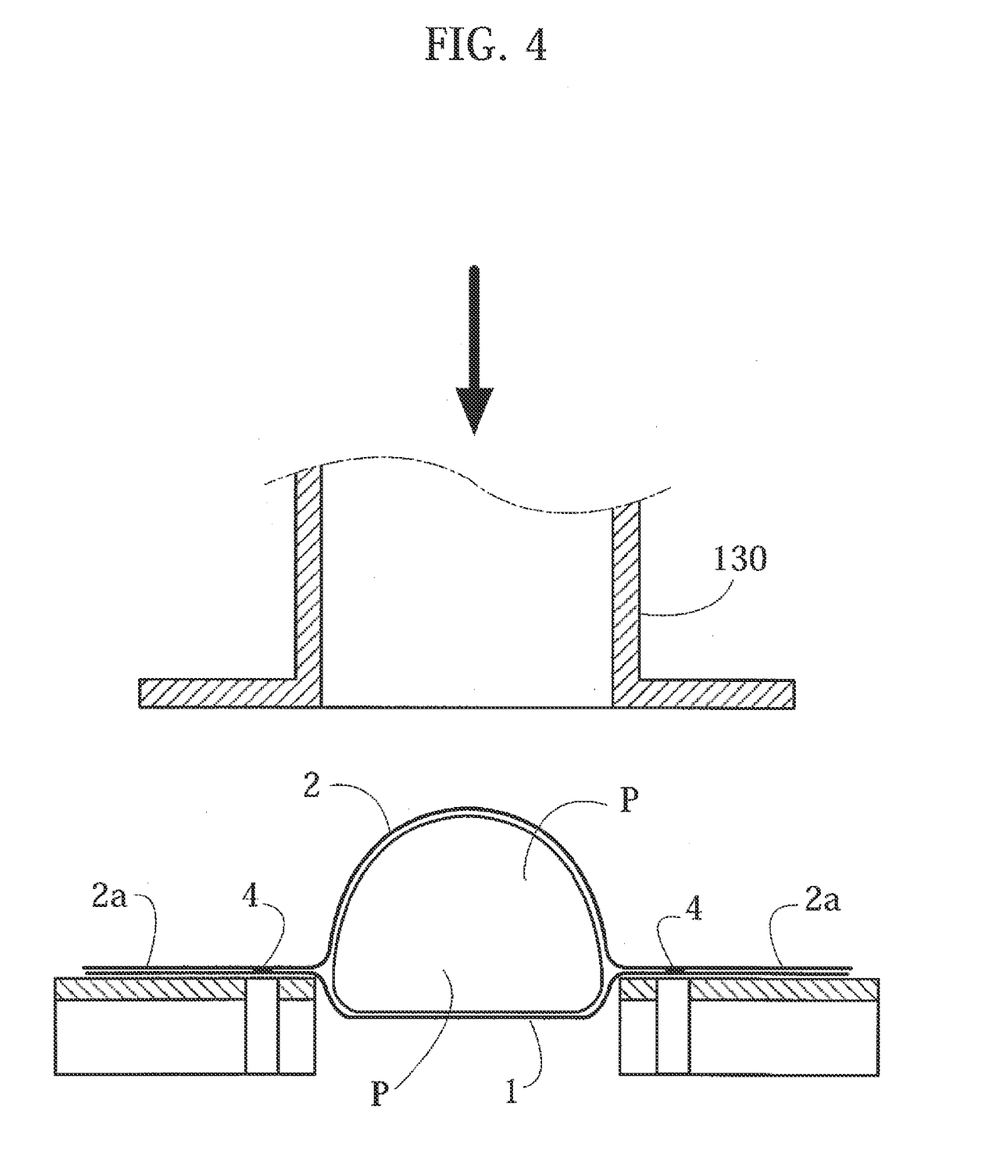

At this point, in the step represented in FIG. 4, sheets 1 and 2 are airtight-seal welded together in correspondence with their mutually facing surfaces, through an additional welding tool 130 (for example, this could be a toroidal tool descending from above onto the set of parts illustrated in FIG. 4).

In the step represented in FIG. 4, the two sheets 1 and 2 are then connected with each other along the entire surface of sheet 1 that faces the surface of the flat part 2a of sheet 2. The fact that the two sheets are in contact along the entire mutually facing surface does not imply that the connection (here also realised by thermal welding, or possibly by ultrasonic welding or with other means) involves with absolute continuity the surfaces involved.

In an embodiment, the connection between surfaces under consideration can actually be continuous. The possibility of realising the connection, for example, as a line of closely spaced dots, or according to a web or line pattern, without the need to pursue an airtight sealed pairing also falls within the scope of the present invention. The possibility of realising the connection between sheets 1 and 2, not on the entire mutually facing area, but only on part of it, for example, omitting an external margin, or concerning the part immediately adjacent to the product P, by taking advantage of the effect of the connection provided by "tacking" 4, falls as well within the scope of the present invention.

For the purpose of realising such connection between surfaces, any type of connection can be used which, in addition to being able to insure airtight sealing (hermetic sealing) of the wrapper thus formed around the product P, is such to provide an integrated or coupled laminar structure where sheets 1 and 2 are connected together, such that the plastic deformability characteristics of sheet 1 are transferred to the union of sheets 1 and 2, therefore to the composite laminar material obtained by paring sheet 1 and sheet 2. This, in such a way that, where sheets 1 and 2 are joined, the springback characteristics of sheet 2 are "tamed", so-to-say, by the plastic deformability characteristics of sheet 1.

In other words, where paired to sheet 1, sheet 2—which alone would tend to return to some extent to its original shape once the deforming force is removed—acquires plastic or permanent deformability characteristics: this because of being coupled to a laminar material (sheet 1) actually having plastic deformability characteristics.

For the sake of completeness, it can also be noted that the tacking operation (for example, performed with the fingers tool 120 of FIG. 3) could be avoided by pairing sheet 1 and the part 2a of sheet 2 acting with the welding tool 130, instead of from above—as is represented in FIG. 4, from below, raising the welding tool 130 while sheet 2 is still retained in the product P wrapping position by tool 110. The solution providing for the tacking 4 is, at least at the moment, preferred for reasons of overall simplicity of the process and device.

Starting from the phase represented in FIG. 4, the method described herein can evolve in at least two different directions.

Figure 5:
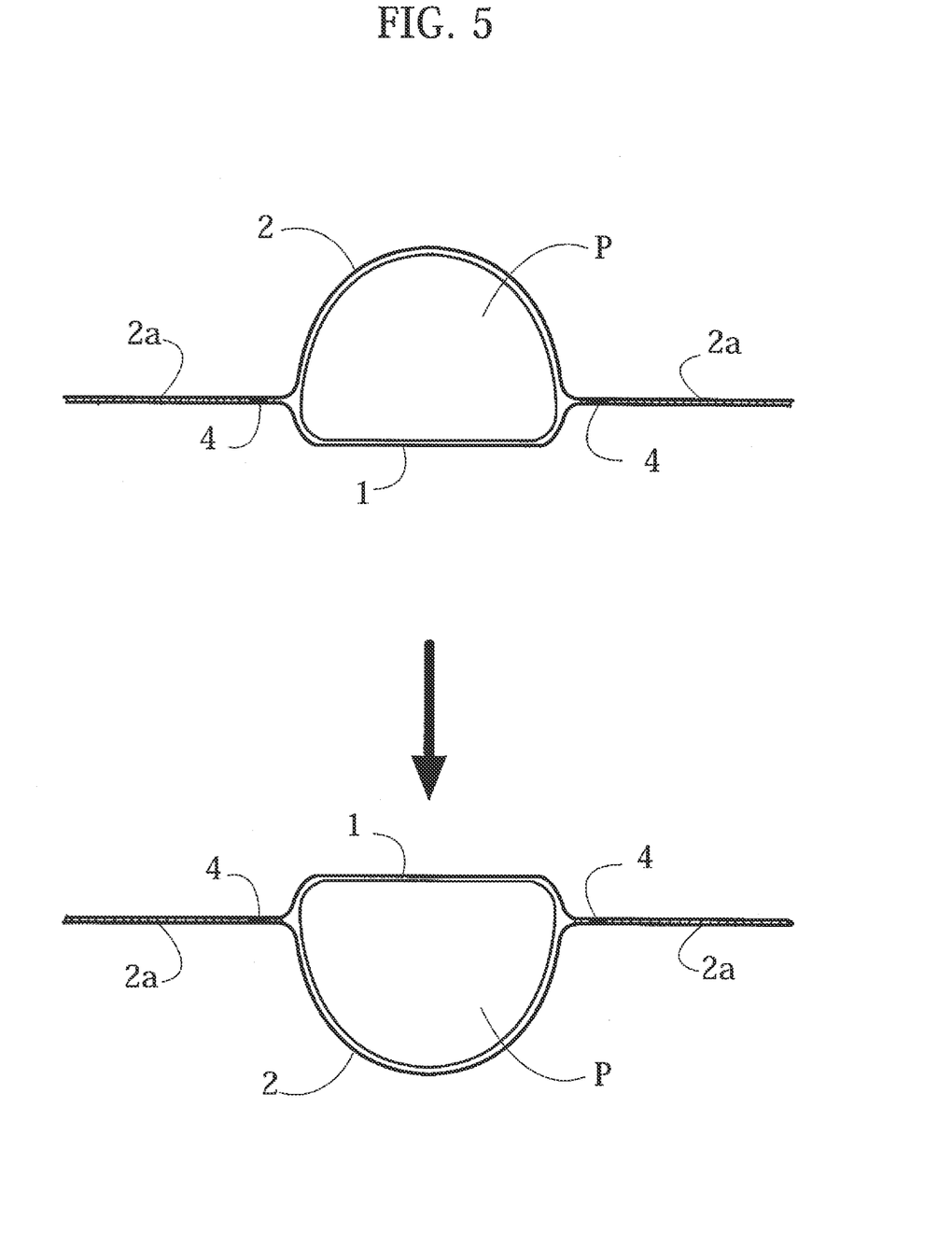

FIGS. 6 and 7 refer to a solution substantially similar to that described in document EP-A-0 591 742 (in particular see FIGS. 5 to 7 therein).

In particular, the complex formed by the product P covered above by sheet 2 and below by sheet 1, with the two sheets connected together along their facing surfaces is turned over (see FIG. 5) and passed through a shaping tool 140 (for example of the deformable blade type according to a general "artichoke-like" conformation described in EP-A-0 082 952) pushing downward with a pushing tool 150. All of this to obtain the result that the external margin of sheet 2 (that is, essentially what was the flat part 2a) is folded against product P, covering also the lower part of product P actually enclosing sheet 1, covering it, if not completely, at least in part. With its plastic deformability characteristics, sheet 1 retains in the closed condition the bow-like part formed by the wrapper 2 in correspondence with the bottom part of the product P.

Regarding this, it will be appreciated that the same result can be achieved also in the case in which the coupling of sheets 1 and 2 omits a reduced external margin of the zone of mutual facing.

At this point, the product P enclosed in the wrapper (sealed airtight, given that sheets 1 and 2 are airtight sealed together at least around the perimeter of the product P) can be located in a receiving cup 5 (petit fours) as illustrated in FIG. 7.

Alternatively, the set of parts resulting from the phase represented in FIG. 4 can be subjected to shaping operations as schematically illustrated in FIGS. 8 and 9. These operations are substantially similar to those described in document EP-A-1 046 579 (in particular, see FIGS. 5 to 7) which lead to giving a basin-like conformation opened above and with pleated walls to sheets 1 and 2 in the region in which they are coupled together, reproducing the appearance of a cuplike element 15. This is a cuplike structure similar to the cuplike structure 5 represented in FIG. 7, but with the characteristic of being provided as an integral part of the package.

Preferably, the operation of formation of the cuplike integral part indicated with 15 in FIG. 9 provides first for the total welding (if not previous effected) and the pleating operation with the pleating directed radially with respect to the region in which sheets 1 and 2 are coupled together.

This region is then cuplike shaped through hot drawing. To improve the result of this operation, it can be useful that the material of which sheet 1 is made, though having the required plastic deformability characteristics also has some resistance to accidental deformation. This property being advantageous for avoiding that the integral cup 15, once formed, is easily dented during the successive product treatment phases.

For example, this result can be achieved by combining a material such as aluminium with a fibrous, paper-like material.

Naturally, maintaining the principle of the invention, the details of construction and the forms of embodiment can be varied, even markedly, with respect to what was described and illustrated herein as a non-limiting example, without departing from the scope of the invention as defined in the following claims.

The invention claimed is:

1. A method of wrapping a product in a wrapper of sheet material, the method comprising:
   forming a concave imprint in a plastically deformable first sheet;
   subsequent to forming the concave imprint, partially housing the product in the concave imprint in the first sheet;
   while the product is partially housed in the concave imprint in the first sheet, applying a second sheet exhibiting springback having larger in-plane dimensions than the first sheet onto said product to form in said second sheet (i) a central part having a dome shape and wrapping around said product and (ii) a peripheral part facing said first sheet,
   coupling said first sheet and the peripheral part of said second sheet, so to form a plastically deformable composite sheet material,
   shaping said plastically deformable composite sheet material forming a wrapper for said product, and
   folding the peripheral part of said second sheet facing said first sheet and coupled with said first sheet against said product.

2. The method to of claim 1, wherein coupling said first sheet and the peripheral part of said second sheet comprises coupling said first sheet and the peripheral part of said second sheet with an airtight sealing connection so to provide the wrapper formed by said first and second sheet with hermetic characteristics.

3. The method of claim 1, wherein coupling said first sheet and the peripheral part of said second sheet comprises realizing along a perimeter of product a tacking connection between said first sheet and said second sheet.

4. The method of claim 3, wherein:
   said second sheet is applied onto said product with a shaping tool,
   said tacking connection is realized while said shaping tool retains said second sheet on said product, and
   the method comprises removing said shaping tool after having realized said tacking connection.

5. The method of claim 3, wherein said tacking connection is realized as a discontinuous connection.

6. The method of claim 1, wherein said concave imprint in said first sheet houses a first portion of said product, said second sheet wraps a second portion of said product, and the surface area of the second portion is greater than the surface area of the first portion.

7. The method of claim 1, wherein the peripheral part of said second sheet is folded against the product such that said second sheet encloses, at least in part, said first sheet.

8. The method of claim 1, further comprising inserting said product, wrapped in said first and said second sheets in a housing container having a cuplike shape.

9. The method of claim 1, further comprising subjecting said composite sheet material to a shaping operation according to a general cuplike conformation.

10. The method of claim 1, further comprising providing, in at least one of said first and said second sheet, a layer of weldable material to realize the coupling between said first sheet and the peripheral part of said second sheet.

11. A method of wrapping a product in a wrapper of sheet material, the method comprising:
   forming a concave imprint in a first sheet capable of retaining stably the concave imprint after removal of a deforming force used to create the concave imprint;
   subsequent to forming the concave imprint, partially housing the product in the concave imprint in the first sheet;
   while the product is partially housed in the concave imprint in the first sheet, applying a second sheet of wrapping material having larger in-plane dimensions than the first sheet onto said product to form in said second sheet (i) a central part having a dome shape and wrapping around said product and (ii) a peripheral part facing said first sheet, wherein the second sheet has a tendency to lose the dome shape in the central part;
   coupling said first sheet and the peripheral part of said second sheet, so to form a plastically deformable composite sheet material and prevent loss of the dome shape in the central part of the second sheet that would occur if the first sheet and the peripheral part of the second sheet were not coupled;
   shaping said plastically deformable composite sheet material forming a wrapper for said product; and
   folding the peripheral part of said second sheet facing said first sheet and coupled with said first sheet against said product.

12. A method of wrapping a product in a wrapper of sheet material, the method comprising:
   applying a first force to a first sheet to form a concave imprint in the first sheet;
   removing the first force, wherein the first sheet retains stably the concave imprint after removal of the first force;
   partially housing the product in the concave imprint in the first sheet;
   while the product is partially housed in the concave imprint in the first sheet, applying a second force to a second sheet having larger in-plane dimensions than the first sheet to form in said second sheet (i) a central part having a dome shape and wrapping around said product and (ii) a peripheral part facing said first sheet;
   forming a composite sheet material, wherein forming the composite sheet material comprises coupling said first sheet and the peripheral part of said second sheet;
   removing the second force, wherein the coupling prevents the central part of the second sheet from losing the dome shape after removal of the second force, and the central part of the second sheet would tend to lose the dome shape after removal of the second force if the first sheet were not coupled to the peripheral part of the second sheet;
   shaping said plastically deformable composite sheet material forming a wrapper for said product; and
   folding the peripheral part of said second sheet facing said first sheet and coupled with said first sheet against said product.

* * * * *